United States Patent
Bernhard et al.

(10) Patent No.: US 6,275,942 B1
(45) Date of Patent: Aug. 14, 2001

(54) SYSTEM, METHOD AND COMPUTER PROGRAM PRODUCT FOR AUTOMATIC RESPONSE TO COMPUTER SYSTEM MISUSE USING ACTIVE RESPONSE MODULES

(75) Inventors: Thomas Bernhard, Round Rock, TX (US); Terry Escamilla, Boulder, CO (US); William Leddy, Austin, TX (US); Richard Letsinger, Austin, TX (US); Crosby Marks, Austin, TX (US); Steven E. Smaha, Austin, TX (US); Steven R. Snapp, Austin, TX (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 09/081,825

(22) Filed: May 20, 1998

(Under 37 CFR 1.47)

(51) Int. Cl.[7] .................................................. G06F 11/34
(52) U.S. Cl. ............................................. 713/201; 713/200
(58) Field of Search ..................................... 713/201, 200, 713/189, 202

(56) References Cited

U.S. PATENT DOCUMENTS

| | | | |
|---|---|---|---|
| 5,414,833 | 5/1995 | Hershey et al. | 395/575 |
| 5,557,742 * | 9/1996 | Smaha et al. | 713/200 |
| 5,623,600 | 4/1997 | Ji et al. | 395/187.01 |
| 5,892,900 * | 4/1999 | Ginter et al. | 713/200 |
| 5,917,912 * | 6/1999 | Ginter et al. | 380/24 |

OTHER PUBLICATIONS

J. Alves–Foss, "An Overview of SNIF: A Tool for Surveying Network Information Flow", Feb. 16, 1995, pp. 94–101.

\* cited by examiner

Primary Examiner—Ly V. Hua
(74) Attorney, Agent, or Firm—Pennie & Edmonds LLP

(57) ABSTRACT

A system, method and computer program product for automatic response to computer system misuse using active response modules (ARMs). ARMs are tools that allow static intrusion detection system applications the ability to dynamically increase security levels by allowing real-time responses to detected instances of computer misuse. Several classes of ARMs exist which allow them to interface with several types of network elements found within a computing environment (e.g., firewalls, web servers, Kerberos severs, certificate authorities, etc.). The ARMs, once defined, are deployed in a "plug and play" manner into an existing intrusion detection system within a computing environment. A user (e.g., system administrator) may then configure the ARMs by linking them to specific computer misuses. Upon receipt of an instance of the computer misuse from the intrusion detection system, each ARM linked to the misuse collects pertinent data from the intrusion detection system and invokes a response specified by the ARM class and the collected pertinent data.

13 Claims, 8 Drawing Sheets

SYSTEM, METHOD AND COMPUTER PROGRAM PRODUCT FOR AUTOMATIC RESPONSE TO COMPUTER SYSTEM MISUSE USING ACTIVE RESPONSE MODULES

BACKGROUND OF THE INVENTION

1. Field of the Invention

The present invention relates generally to computer network security systems, and more particularly to providing a system, method and computer program product for providing flexible and automatic responses to instances of computer system misuse.

2. Related Art

Given the current explosion in the use of and reliance on computers and computer networks (especially the global Internet), computer security is becoming a major concern of corporations, organizations, individuals and other computer users. Today, for example, many organizations are reliant on computers and computer networks to link remote offices, share data and other resources among employees within an office, communicate with customers via electronic mail, reach new customers via electronic commerce, and to provide information by operating World Wide Web pages that are accessible via the Internet. This reliance on computer networks has a downside in that sensitive data now resides on computer network servers which, left unprotected, can potentially cost an organization millions of dollars if misused.

Computer misuse generally involves the unauthorized access of an organization's computers (or resources connected to the communication network) from outside "hackers," or can involve employees inside the organization accessing information or other resources without authorization. That is, an instance of computer misuse can take the form of an outside intrusion or an inside unauthorized access. Moreover, misuse can not only take the form of unauthorized access of an organization's computers (and thus data) but also the destruction (i.e., deletion) of data. Such destruction of vital data (e.g., customer databases) can also be costly to an organization. In essence, a misuse is any activity that would be deemed unacceptable if it were known to the party responsible for the security of the particular computer network in question.

With the problem of computer misuse rising, a new computer security industry has developed and blossomed over the past several years. Products such as virus detectors, firewalls, and virtual private networks (VPNs) have come into existence. Furthermore, there exist several authentication, network management, digital certificate, and intrusion detection software on the market all aimed at computer security.

Of note, however, are the several forms of intrusion detection products now available. Intrusion detection involves monitoring a computing environment, looking for unauthorized users or those authorized users who are misbehaving (e.g., a disgruntled employee deleting sensitive data). Generally, these systems incorporate state table, anomaly detection and/or expert system techniques to detect patterns (commonly referred to as "signatures" or "footprints") of misuse. A signature is simply a set of events (states of a computer) and a set of instructions that transition between events that define a misuse. For example, a user who unsuccessfully attempts to login three times, and then achieves a successful login, may define the signature (a collection of events and transitions) of an outside hacker attempting to invade an organization's network.

The various intrusion detection products typically make use of a misuse engine software module that is the "heart" of the detection system and behaves like a security camera for the network. An exemplary misuse engine, as part of an intrusion detection system, is described in U.S. Pat. No. 5,557,742 issued to Smaha et al., which is incorporated herein by reference in its entirety.

One shortcoming of today's intrusion detection systems is that once an intrusion (i.e., a signature) is detected, the response is usually "hard coded." That is, the response to a particular misuse is usually determined and defined when the engine is installed in a particular computing environment. Thus, once the misuse engine detects a problem, the response is always fixed. The conventional responses to detected misuses have been to contact a system administrator via electronic mail, telephone or pager, or simply log the detected misuse into a log file for later analysis. These systems are inflexible and do not provide for a true real-time response to a misuse of an organization's computer network. They also do not attempt to counter or fix the problems arising from the detected misuse. Further, they do not provide a flexible upgrade path to take advantage of new technologies, or to adopt to evolving needs of the computer user.

Therefore, given the above-described limitations, what is needed are a system and method for automatic response to computer system misuse. Further, what is needed is a system, method and computer program product that allow new automated response modules to be installed after the initial deployment of the intrusion detection system. In other words, what is needed is a flexible, true real-time reaction to a detected misuse rather than or in addition to an alarm (i.e., a simple notification).

SUMMARY OF THE INVENTION

The present invention is directed to a system, method and computer program product for automatic response to computer system misuse using active response modules (ARMs). The method for automatically responding to a computer misuse includes the steps of defining a plurality of ARMs to process instances of computer misuse, receiving an instance of misuse from an intrusion detection system (the instance of the misuse having been detected by the misuse engine) and identifying ARMs associated with and activated for the detected computer misuse. The method then, for each of the identified ARMs, collects pertinent data from the misuse engine and invokes each of the identified ARMs with the pertinent data.

The system includes a data processing element, a misuse engine that is part of an intrusion detection system, and a plurality of ARMs each having means for instructing the data processing element to perform an action or series of actions in response to being invoked by the misuse engine. The misuse engine includes means for detecting a misuse, means for identifying any of the ARMs associated with and active for the misuse, and means for invoking the identified ARMs to thereby respond to the misuse.

One advantage of the present invention is that it provides automated active response modules (ARMs) that can respond in real-time to instances of computer misuse detected by a misuse engine.

Another advantage of the present invention is that the ARMs provide flexible response to instances of computer misuse detected by a misuse engine. New ARMs may be defined and deployed in a "plug and play" manner into an existing computing environment that utilizes any type of intrusion detection system. At any time, any of the ARMs may be associated with and activated for any given instance of misuse.

Another advantage of the present invention is that the flexibility of the ARMs allows compatibility with several different types of computer network elements. Any time a computer environment adds, removes, or changes a particular network element, the ARMs may be modified accordingly to ensure compatibility.

Yet another advantage of the present invention is that different ARMs may be created and installed as add-ons into any existing computing environment containing a variety of network elements manufactured by different vendors. Several different ARMs may be pre-configured to communicate (i.e., "plug") into different vendors' network elements.

Further features and advantages of the invention as well as the structure and operation of various embodiments of the present invention are described in detail below with reference to the accompanying figures.

BRIEF DESCRIPTION OF THE FIGURES

The features and advantages of the present invention will become more apparent from the detailed description set forth below when taken in conjunction with the figures in which like reference numbers indicate identical or functionally similar elements. Additionally, the leftmost digit of a reference number identifies the figure in which the reference number first appears.

DETAILED DESCRIPTION OF THE PREFERRED EMBODIMENTS

Table of Contents

I. Overview
II. System Architecture
III. ARM Architecture
IV. Building ARMs
V. Classes of ARMs
  A. Firewall ARMs
  B. Kerberos ARMs
  C. Certificate Authority ARMs
  D. Web Server ARMs
  E. Environment Security Management ARMs
  F. Fix-it ARM
  G. Standard ARMs
  H. Summary
VI. Installing and Updating ARMs
VII. Graphical User Interface for ARM Usage
VIII. Detailed Example of Building an ARM: Fix-it
IX. Intrusion Detection System-ARM Interaction
X. Environment
XI. Conclusion I. Overview The present invention relates to a system, method and computer program product for automatic response to computer system misuse using active response modules (ARMs). In a preferred embodiment of the present invention, an entity such as a private or public corporation, organization or individual maintains a computer network which includes any combination of firewalls, servers, and computer (i.e., data processing) workstations, and other computing resources.

The entity employs a system administrator (commonly referred to as a "sysadmin") who is a person charged with performing various tasks including up-keeping and monitoring the computer system. The sysadmin may use an intrusion detection system software to monitor any possible misuse of the computer system.

The present invention is directed to providing a system, method and computer program product for automatic response to computer system misuse using active response modules (ARMs). The ARMs of the present invention allow a sysadmin to continually configure and customize (as desired and/or required) the responses to instances of misuse detected by the intrusion detection system's misuse engine. Instances of misuse contemplated by the ARMs of the present invention include, but are not limited to, an illegal login, jump, privilege (i.e., root) usage and access to files within a protected directory. The scope and spirit of the present invention include other types of computer misuses, both presently known and those identified in the future.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., providing ARMs for an intrusion detection system running within a web server, a proxy server, a single workstation, an entire network, etc.).

II. System Architecture

Figure 1:
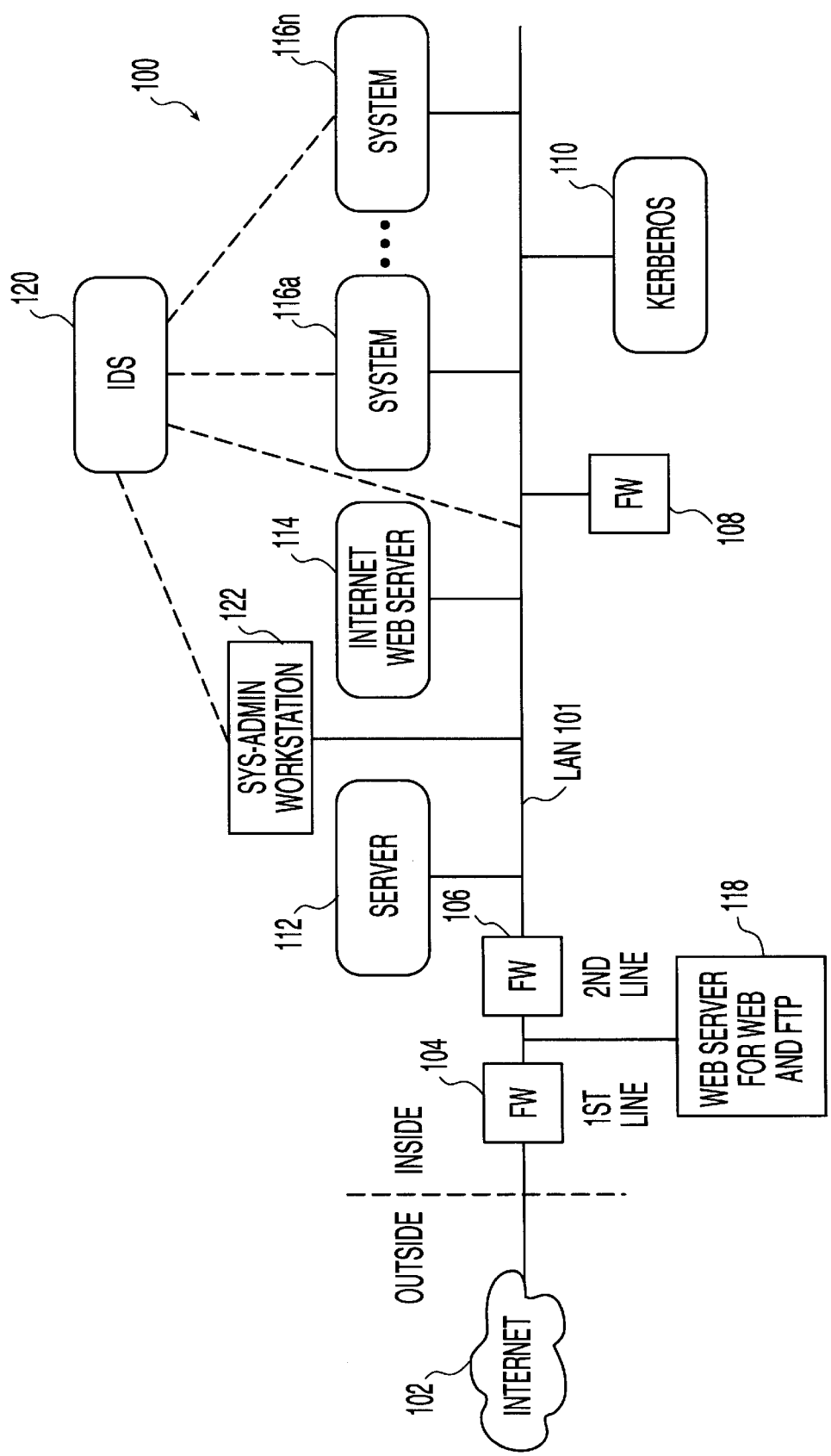
FIG. 1 is a block diagram of an exemplary computer environment in which the present invention may be implemented.

FIG. 1 is a block diagram of an exemplary computer network 100 in which the present invention may be implemented. It should be understood that the particular computer network 100 in FIG. 1 is shown for illustrative purposes only and does not limit the invention. FIG. 1 represents a modern corporate local area network (LAN) 101. A first line firewall 104 (shown as "FW" 104) serves as the connection and separation between the corporate LAN 101, which includes a plurality of network elements "inside" of the LAN 101, and the global Internet 102 "outside" of the LAN 101.

A firewall is well-known in the relevant art. For completeness, however, the following brief description is given. A firewall is a dedicated gateway machine with special security precaution software. The firewall is used, for example, to service Internet connections and dial-in lines. The firewall protects a cluster of more loosely administered machines (network elements) hidden behind it from outside misuse (i.e., intrusion). A typical firewall is an inexpensive and minimally featured microprocessor-based Unix machine with no critical data. It usually includes modems and public network ports connected to the "outside," and one carefully watched connection back to the "inside" network elements. More powerful and fully featured firewalls are also publicly available, such as the Gauntlet™ firewall available from Trusted Information Systems, Inc. of Glenwood, Md.

Returning to FIG. 1, the computer network 100 includes a second line firewall 106 connected to the LAN's server 112. The computer network 100 also includes a third firewall 108, a Kerberos server 110, an intranet Web server 114, a plurality of data processing systems (i.e., workstations) 116a–n, and an Internet Web server 118. All of these network elements connected to LAN 101 are monitored for computer misuse using an intrusion detection system (IDS) software 120. The IDS software 120 may reside and be centrally configured and monitored from a sysadmin workstation 122. The IDS software 120, as indicated in FIG. 1, may also reside on one or more of the network elements (e.g., data processing systems 116) as well as at various points within the LAN 101 between network elements (thereby acting as network-level detectors). The IDS software 120 may operate on any number of principles, such as the one specified in U.S. Pat. No. 5,557,742 issued to Smaha et al.

The ARMs of the present invention operate with the particular misuse engine of the IDS software 120 selected and installed by the sysadmin of the computer network 100 in a "plug and play" manner.

III. ARM Architecture

Figure 2:
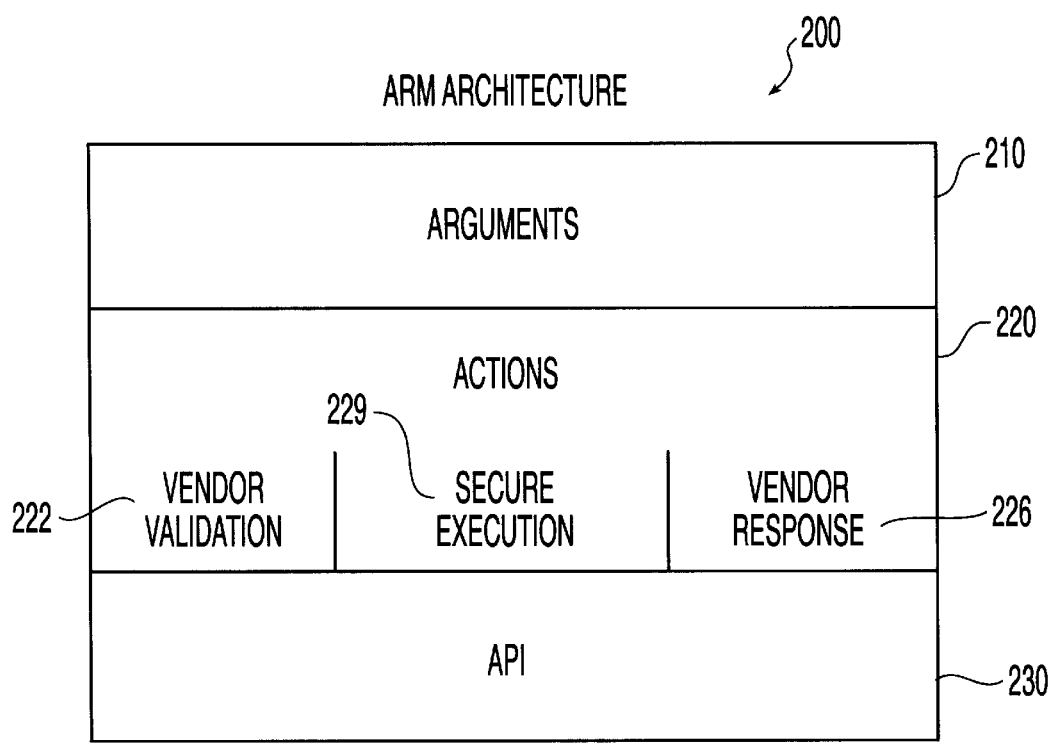
FIG. 2 is a block diagram illustrating an architecture of an active response module (ARM) according to a preferred embodiment of the present invention.

FIG. 2 is a block diagram illustrating an architecture 200 of an active response module (ARM) according to a preferred embodiment of the present invention. Each class of ARMs defined according to the present invention may be based upon architecture 200. Architecture 200 is driven by the fact that ARMs are associated with and activated for different types of misuses. Thus, each ARM, as a result of its association with and activation for an instance of misuse, will interact with a particular network element within LAN 101 in order to respond to the misuse.

Each ARM (i.e., architecture 200) includes an arguments component 210, an actions component 220, and an application program interface (API) component 230. It should be understood that other architectures for ARMs may be employed. Such other architectures will be apparent to one skilled in the relevant art(s) based on the discussion contained herein.

The arguments component 210 of architecture 200 specifies the parameters that the misuse engine of the IDS 120 must pass to the ARM when the ARM is invoked upon detection of an instance of misuse. These parameters are analogous to the parameters list of a high-level language function or procedure call. The parameters include information the ARM will need in order to perform the actions specified by the ARM and respond to a particular instance of a misuse. The parameters may include, for example, userid, groupid, pathname, name of a network element, source Internet Protocol (IP) address, source port, contact phone number, etc. In a preferred embodiment, all classes of ARMs (as described below in Section V) may use the same standard parameter list. The parameters within the list that are not needed or used for a particular ARM would have a null value and be ignored by the actions component 220 of the ARM when invoked by the IDS software 120.

The actions component 220 of architecture 200 specifies and causes the response of the ARM upon detection of an instance of misuse by the misuse engine and upon subsequent invocation of the ARM. The actions component includes a vendor validation component 222, a secure execution component 224, and a vendor response component 226. The latter two components (224 and 226) are run-time components which function upon invocation of the ARM and the former component (222) is an initiation component which functions upon the installation (i.e., configuration process 400 as explained below with reference to FIG. 4A) of the ARM.

The vendor validation component 222 specifies and causes the user-specified data fields to be checked when the ARM is configured. The data fields checked depend on the particular network element of LAN 101 involved during the invocation of the ARM, and thus, ultimately will depend on the type of misuse detected and the class of ARM invoked by the IDS 120(as described below in Section V). In a preferred embodiment, these data fields are checked when the ARM is first configured via a graphical user interface (GUI) as described below with reference to FIG. 4A (and more specifically step 416). The vendor validation component 222 checks data fields such as firewall name and password during the configuration process to ensure they will be accurate during run-time.

The secure execution component 224 checks, at run-time (i.e., during the execution of the ARM), to make sure the process identification number (PID) of the process calling the ARM is that of the IDS software 120. This check is necessary because ARMs may, for example, instruct a firewall to shut down. Thus, the ARM must make sure its invocation and subsequent shut down of the firewall (in this example) is in response to the IDS 120 ordering it to do so rather than an instruction from an outside hacker posing as the IDS 120. As is well-known in the relevant art(s), the PID is an integer used by operating systems (such as the Unix kernel) to uniquely identify a process, although the present invention is not limited by this specific implementation.

The vendor response component 226 is the actual component (e.g., source code) of the ARM that specifies the response (i.e., actions) the ARM will perform upon being invoked by the IDS software 120. This component directly interacts with the API component 230.

The API component 230 of architecture 200, as the name suggests, specifies the interface by which the ARM accesses the network element it is designed to communicate with upon detection of an instance of misuse. As is well-known in the relevant art(s), each vendor of a network element may define an API to its product at the source code level. The API provides, via calling conventions, a level of abstraction between an entity wishing to communicate with the network element (such as the ARM) and the network element itself. For example, a "check point ARM" may be defined which will, upon detection of particular misuses, remotely communicate with a FireWall-1™ firewall which is available from Check Point Software Technologies Corp. of Redwood City, Calif.

The API component 230 of the ARM architecture 200 ensures code portability of the ARM's other components. By interchanging an ARM's API component 230, several ARMs may be defined to interact with similar network elements manufactured by different vendors, where the only significant difference between the ARMs is their respective API component 230.

IV. Building ARMs

Figure 3:
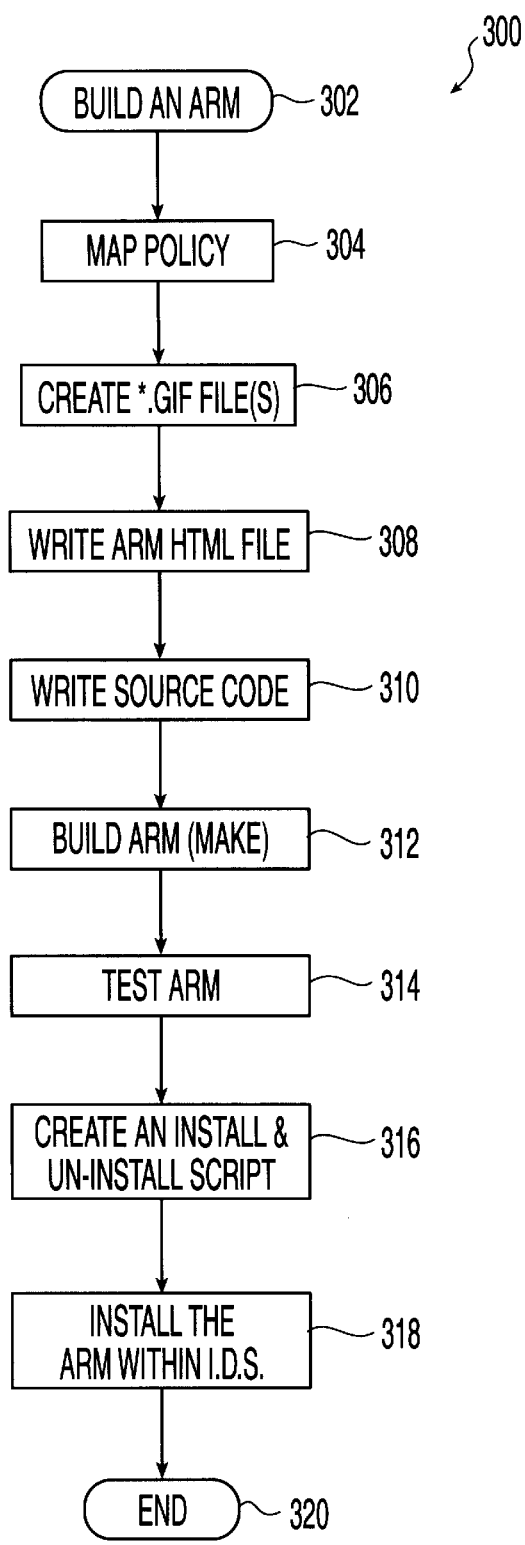
FIG. 3 is a flowchart representing a process of building an ARM according to a preferred embodiment of the present invention.

Referring to FIG. 3, a top-level flowchart representing an ARM building process 300 according to a preferred embodiment of the present invention is shown. Given the architecture 200 of the ARMs and their plug and play flexibility, developers (i.e., software designers) may build various ARMs as new hardware is developed or new misuses become recognized. Thus, the ARM building process 300 may be followed by a developer when a new ARM is desired.

ARM building process 300 begins at step 302 with control passing immediately to step 304. In step 304, the developer maps (develops and designs) a security policy. The security policy involves the misuse being targeted and the response plan the new ARM will implement.

In step 306, one or more Graphics Interchange Format (GIF) files (*.gif) may be created for the new ARM. GIF, a standard for compressed digitized images developed by CompuServe, Inc. of Columbus, Ohio, is well-known in the relevant art(s). Other image formats may alternatively be used. In a preferred embodiment of the present invention, the GIF file(s) contain an image (i.e., icon) which the GUI will use to associate such procedures as configuration, update, and help with the new ARM.

In step 308, an ARM Hypertext Markup Language (HTML) file is written for the new ARM. Other formats may alternatively be used. This (*.html) file contains the actual help text for a user (e.g., the sysadmin) who clicks, via the GUI, the image from the *.gif file of step 306. That is, the GUI will link the icon (*.gif) file to the text (*.html) file.

In step 310, the actual source code for the new ARM is written. In a preferred embodiment of the present invention, the source code is written in a high-level language such as the C or C++ programming language. The structure of the source code (i.e., a collection of *.c files) implements architecture 200. When executed, the code validates configuration data entries (see the vendor validation component 222 of FIG. 2 above and steps 412–418 of FIG. 4A below) and executes the ARM's response (i.e., the actions component 220 of the ARM) while utilizing the appropriate API (as part of API component 230) for a misuse detected by the IDS software 120. The code produced in step 310 preferably implements the security policy developed in step 304.

In step 312, the ARM executable is built, for example, by using the Unix "make" utility which is well-known in the relevant art(s). In other words, the source code written in step 310 is compiled in step 312. The make utility automates the (re)compilation and linking of programs, taking into account the interdependencies of source code modules and their modification times. The make tool reads instructions from a "makefile" that specifies a set of targets to be built, the files they depend on and the commands to execute in order to produce them. As a result of step 312, an executable (*.exe) file will be created which the IDS software 120 will call (with the correct parameters) when the misuse linked to the ARM is detected.

In step, 314, the newly built arm is tested. Testing can be done in any well-known manner such as, for example, bottom-up testing (unit testing, integration testing and then system testing). Once testing reveals that the new ARM functions properly, an install and an uninstall script is written for the new ARM in step 316. These scripts will allow a sysadmin to install (i.e., plug) and uninstall, respectively, the new ARM for use with their existing IDS 120. The format of these scripts will depend on the operating system in use within the computing environment where the new ARM will be used and will be apparent to one skilled in the relevant art(s). For example, a Windows NT™ environment calls for a batch (*.bat) file, whereas a UNIX™ environment calls for a shell script (*.sh) file to implement the install and uninstall scripts.

In step 318, the new ARM is installed by the sysadmin (using the install script on workstation 122) within the IDS 120 for a computing environment such as computer network 100. The ARM building process 300 then ends as indicated by step 320. Once the ARM building process 300 is completed, the ARMs can be configured and updated as part of the pre-existing IDS software 120 on computer network 100 for "play"(as detailed by configuration process 400 and update processes 425 described below with reference to FIGS. 4A and 4B, respectively).

In a preferred embodiment of the present invention, a toolkit is provided to developers for building new ARMs. The ARMs toolkit provides an environment including sample source code files, makefiles, icon files, and a GUI to allow the creation, manipulation, and modification of ARMs. The ARMs toolkit is preferably fully documented with references to README and help files for each step of building process 300.

V. Classes of ARMs

Thus far, the description of the active response modules have been generalized. Below is a more detailed description of the types (i.e., classes) of ARMs that may be defined according to a preferred embodiment of the present invention.

Many of the various classes of ARMs that may be defined are driven by the various types of network elements that the ARMs will communicate with while responding to an instance of computer misuse. Thus, generally speaking, the various types of network elements which may be found within a computing environment (e.g., computer network 100) where an intrusion detection system (e.g., IDS software 120) has been installed dictate the types of ARMs needed and dictate the ARM's API component 230. Exceptions, however, to this general rule exist (e.g., the class of standard ARMs describe below).

While many of these network elements are well-known to those skilled in the relevant art(s), they and the ARMs designed to link to them are summarized below for completeness. It should be understood that the ARMs presented below are discussed herein for illustrative purposes only. The present invention is not limited to the following ARMs. Instead, the invention includes ARMs for responding to any computer misuse, now known or recognized in the future, and includes ARMs for working with any data processing device (network element) now existing or developed in the future. The implementation of such additional ARMs will be apparent to one skilled in the relevant art(s) based on the discussion contained herein.

A. Firewall ARMs

As mentioned above, a class of firewall ARMs is defined to communicate with firewalls (e.g., first line firewall 104 and second line firewall 106). ARMs are defined for different vendor's firewalls such as the Gauntlet™ firewall available from Trusted Information Systems, Inc. of Glenwood, Md., the FireWall-1™ firewall available from the Check Point Software Technologies Corp. of Redwood City, Calif., the Pix™ firewall available from Cisco Systems, Inc. of San Jose, Calif., etc. Each vendor's firewalls have their own features, including their own APIs, thus dictating the ARMs' API component 230.

The misuses linked to such an ARM (see step 440 of FIG. 4B below) involve, for example, a user who telnets into computer system 100 from an external site through the firewall 104 and performs an operation which is considered a misuse. The firewall ARM, as part of its actions component 220, may then instruct the firewall to stop any further accesses from the originating IP address. The offending site would not be able to access anything inside the firewall 104 until the sysadmin investigates the incident. Thus, the IP address of the offending site would be one of the arguments specified in the ARM's argument component 210.

B. Kerberos ARMs

A Kerberos third-party authentication unit (such as Kerberos server 110), which is well-known in the relevant art(s), is the authentication system developed as part of MIT's Project Athena. It is based on symmetric key cryptography and has been adopted by the Open Software Foundation (OSF) as the basis of security for the Distributed Management Environment (DME) standard. Microsoft's Windows NT™ 32-bit operating system (release 5.0), which already includes built-in security features, will include Kerberos functionality.

The misuses linked to such an ARM involve, for example, a user who performs a misuse incident on a system in an environment which is using Kerberos. The misuse engine would invoke an ARM to tell the Kerberos server to invalidate any requests for confirmation of the user's identity. When a networked application attempts to verify the validity of the user, it would get a negative result. The Kerberos server 110, based on commands received from the ARM either forces the user to re-authenticate (login again on the network) or disables the account until the sysadmin investigates, or performs some other implementation-dependent action. These responses would be specified in the ARM's actions component 220 using calls to a Kerberos server API as part of its API component 230.

C. Certificate Authority ARMs

A certificate authority is an entity (typically a company) that issues digital certificates to other entities (organizations or individuals) to allow them to prove their identity to others. A certificate authority might be an external company that offers digital certificate services or they might be an internal organization such as a corporate management information systems (MIS) department. The certificate authority's chief function is to verify the identity of entities and issue digital certificates attesting to that identity. The misuses linked to such an ARM involve an example similar to the Kerberos ARM mentioned above.

D. Web Server ARMs

A web server (such as intranet Web server 114 and Internet Web server 118) is a server process running at a web site which sends out web pages in response to Hypertext Transfer Protocol (HTTP) requests from remote browsers. They typically include such features as server-side include, authentication and access control mechanisms, as well as provide an API. The misuses linked to such an ARM involve, for example, for a web server that authenticates users, disabling the cached credentials to force re-authentication and disabling any potentially corrupted web pages.

E. Environmental Security Management ARMs

These ARMs interact with centralized network-level security environment software products, that typically run on sysadmin workstation 122, such as TME 10 Security Manager available from Tivoli Systems, Inc., of Austin, Tex. or CyberCop™ available from Network Associates of Santa Clara, Calif.

F. Fix-it ARM

A "fix-it" ARM is user-configurable to keep track of sensitive directories and thus, the files within those directories. The fix-it ARM utilizes the cache of a computer system 116 to store a backup of the data contained in any user-specified sensitive directory. The use of a cache, a small fast memory which is often located on the same integrated circuit as the CPU (primary cache) or a larger, often slower memory located outside the CPU chip (secondary cache), is well-known in the relevant art(s).

In a preferred embodiment, the fix-it ARM allows a user to toggle (i.e., turn on or off) three options thereby resulting in eight ($2^3$) permutations of different actions (as part of actions component 220) the fix-it ARM may take in response to a linked misuse. The three options are: (1) Save_Bad; (2) Restore; and (3) Delete_Corrupt. These options are described in detail in Table 1 below. The options allow the fix-it ARM to act as a "self-healing" mechanism in response to file related instances of misuse (e.g., file deletion, corruption or tampering). For example, a user may configure the fix-it ARM (explained below with reference to FIG. 4A) to turn on the Restore and Delete_Corrupt options, and turn off the Save_Bad option. Thus, if a misuse attacks a sensitive file, the fix-it ARM will respond by copying the back-up version of the file from the cache and delete the corrupted version of the file. Because the Save_Bad option is turned off, however, the sysadmin will not be able to later analyze the corrupted version to determine what the person responsible for the detected misuse was attempting to do with the sensitive file.

TABLE 1

| FIX-IT ARM OPTION | DESCRIPTION OF ACTION |
| --- | --- |
| Save_Bad | When this option is turned on the Fix-it ARM will save a copy of the attacked file (e.g., /etc/passwd in a Unix system) to allow the sysadmin to study the file and determine what the intruder was trying to accomplish. |
| Restore | When this option is turned on the Fix-it Arm will write (i.e., restore) file(s) (e.g., customer database files) from the cache back-up to the user-specified sensitive directory(ies). |
| Delete_Corrupt | When this option is turned on the Fix-it Arm will delete a file that has been corrupted as a result of an instance of misuse. |

Therefore, the disk operating system of network 100 is the network element that the fix-it ARM would link to. Furthermore, the API component 230 of the fix-it ARM uses the disk-related commands of the operating system(s) used within computer network 100.

The frequency of updating the cache version of the files within any sensitive directory is also user-specified. Thus, when authorized changes, additions, etc. are made to these files, the fix-it ARM will automatically, within each update period (e.g., nightly or weekly), copy the data within the sensitive directory to the cache. All user-specified parameters of the fix-it arm may be set using configuration process 400 (and more specifically steps 412–418 of FIG. 4A) via the use of a GUI as described below with reference to FIGS. 5A and 5B.

To take advantage of a fix-it ARM, the intrusion detection system running on the computer network 100 preferably runs on a system level. That is, the intrusion detection system preferably monitors everything that happens on every network element within computer network 100 (i.e., works with the operating system of systems 116). This is in contrast to intrusion detection systems that operate on the network level. Those systems simply monitor network packet traffic between network elements and thus, have no "view" of local directories and files on any of the network elements within computer network 100.

G. Standard ARMs

Another class of ARMs that may be defined according to a preferred embodiment of the present invention are referred to as "standard ARMs." Standard ARMs are those ARMs which are useful in almost every computer network environment, can respond to any type of misuse and do not necessarily depend on the presence of certain network elements. For example, ARMs that page or call a sysadmin, create a log file, send electronic mail, etc. would be considered standard ARMs. These ARMs would be linked to a specific misuse along with any other classes of ARMs, thus illustrating how one instance of a detected misuse may trigger multiple ARMs of possibly different classes.

H. Summary

In summation, areas for ARM responses are applying local remedies (e.g., fix-it ARMs), forcing re-authentication, and interacting with vendors' prevention security applications of system facilities to enhance the protection in response to the incident information (e.g., firewall configuration or disabling system accounts). Thus, the ARMs of the present invention will allow real-time responses such, for example, as killing offending processes, killing offending logins, disabling the login of offending users, shunning logins of offending users, restarting a Web server and generating Simple Network Management Protocol (SNMP) traps. However, as indicated above, the present invention is not limited to these examples.

Specifically, the preceding classes and examples of ARMs are presented by way of illustration and not intended to be exhaustive. Based on the descriptions herein, it will be apparent to one skilled in the relevant art(s) how to implement additional classes or specific ARMs for linking with additional network elements. For example, a proxy server—a computer and associated software that passes Uniform Resource Locator (URL) request from a Web browser and returns the results to a client sealed off from the Internet and which is well-known in the relevant art(s)—may be added as a network element within LAN 101. An ARM which links with a proxy server may then be defined.

VI. Installing and Updating ARMs ("Plug and Play")

Figures 4A, 4B:
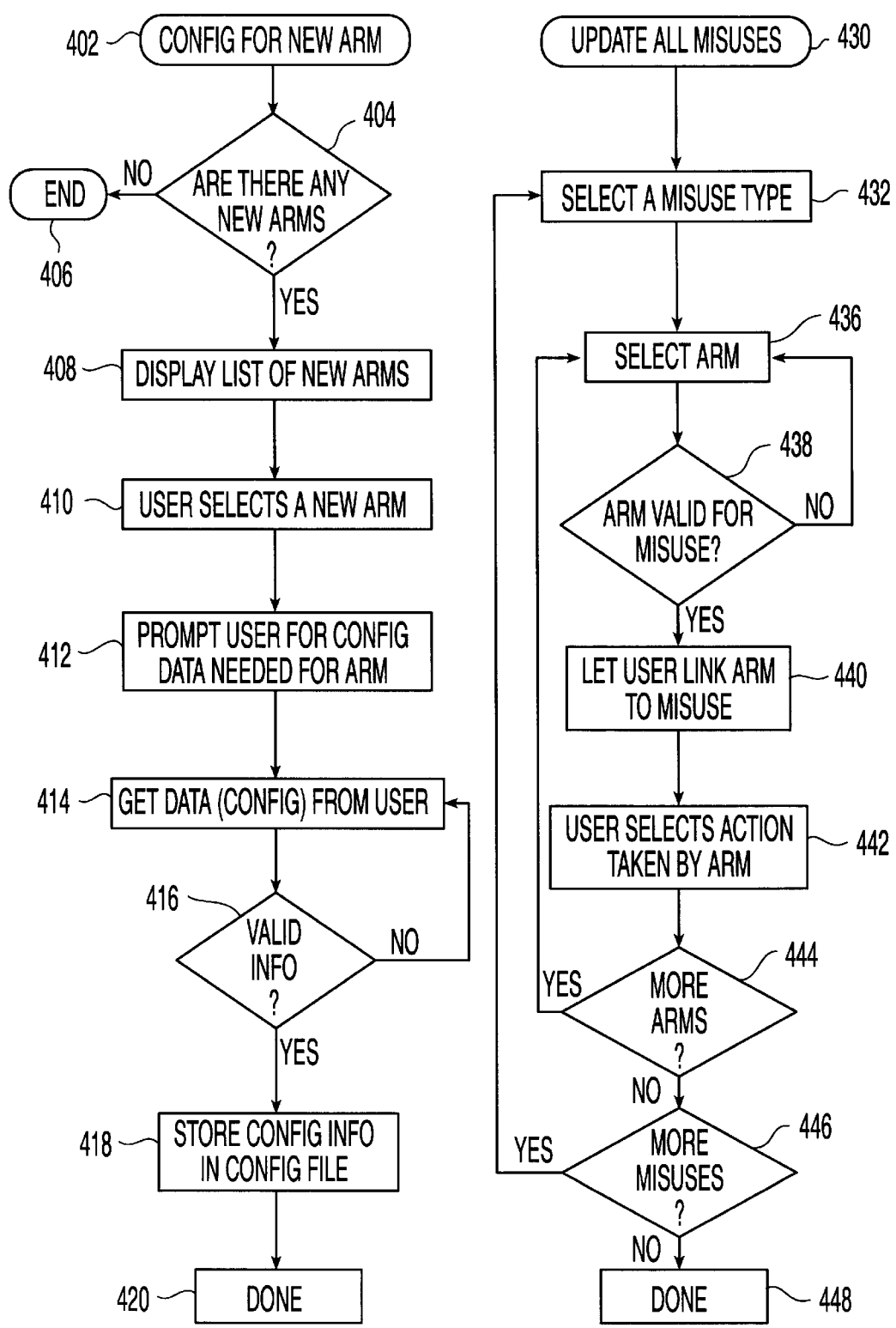
FIGS. 4A and 4B are flowcharts representing a configuration process and an update process for ARMs, respectively, according to a preferred embodiment of the present invention.

Referring to FIG. 4A, a configuration process 400 according to a preferred embodiment of the present invention is shown. Configuration process 400 is used by a sysadmin to configure the IDS 120 running within computer network 100. The configuration process 400 may be run periodically from a GUI residing on workstation 122, as will be described below with reference to FIGS. 5A and 5B, by the sysadmin when new ARMs become available and are installed into the pre-existing IDS 120 on computer network 100 as "add-ons."

Configuration process 400 begins at step 402 with control passing immediately to step 404. In step 404, the configuration process 400 ensures that any possible new ARMs have actually been installed (i.e., "plugged in"). If not, configuration process 400 ends as indicated by step 406. If any new ARMs are available, a list of them is displayed in step 408. New ARMs will be available as a result of the ARM building process 300 explained above with reference to FIG. 3.

In step 410, the user (e.g., sysadmin) selects a new ARM for implementation within the IDS 120. In step 412, the configuration process 400 prompts the user for any configuration data that the new ARM requires in order to function properly. This configuration data may include telephone or pager numbers for sysadmin notification of instances of misuse, hardware interface information, and the like. In step 414, the data that was prompted for in step 412 is collected. In step 416, the data is verified to ensure it is valid (e.g., "does the telephone number data field have at least 7 digits?"). This verification, as discussed above, is done through the ARM's vendor validation component 222.

If the data collected from the user is determined to be invalid, configuration process 400 returns to step 414 to collect valid data from the user. If step 416 determines the data collected in step 414 is valid, the data is then, in step 418, stored in an ARM configuration (*.dat) file so that the ARM can later access the data when it is invoked by the IDS software 120. Configuration process 400 then terminates as indicated by step 420.

Referring to FIG. 4B, a update process 425, used by a sysadmin to update the IDS 120 running within computer network 100 according to the present invention, is shown. The update process 400 may be run periodically from a GUI residing on sysadmin workstation 122 by the sysadmin after new ARMs are installed and configured using configuration process 400, or in response to changing conditions (for example, the recognition of a new or modified misuse).

Update process 425 begins at step 430 with control passing immediately to step 432. In step 432, the user first selects a misuse type. In step 436, the user selects an ARM. In step 438, update process 425 determines if the ARM and misuse pair selected are valid. That is, is the response specified by the ARM congruent with the misuse selected. For example, if a fix-it ARM is selected as the active response module for a "wrongful super user login" type misuse, this would not be an appropriate paring and thus, determined to be invalid by step 438. If step 438 determines the paring is valid, update process 425 proceeds to step 440. Else, update process 425 returns to step 436 to allow the user to correct the ARM selection. The logic to perform step 438 would reside in the ARM's vendor validation component 222.

In step 440, the ARM is linked to the misuse selected in step 432. In step 442, the user can then select the particular action taken by the ARM. Because ARMs are designed to be flexible, many allow the user to select from a list of predefined actions to be taken in response to the detected misuse (e.g., see Table 1). Update process 425 then terminates as indicated by step 448. Thus, the new ARMs "plugged" into the IDS 120 by configuration process 400 can be made ready for "play" using update process 425. As previously suggested, update process 425 may allow several ARMs to be linked to a single detected misuse as long as each selected ARM is valid for that misuse (see step 438).

VII. Graphical User Interface for ARM Usage

Figure 5A:
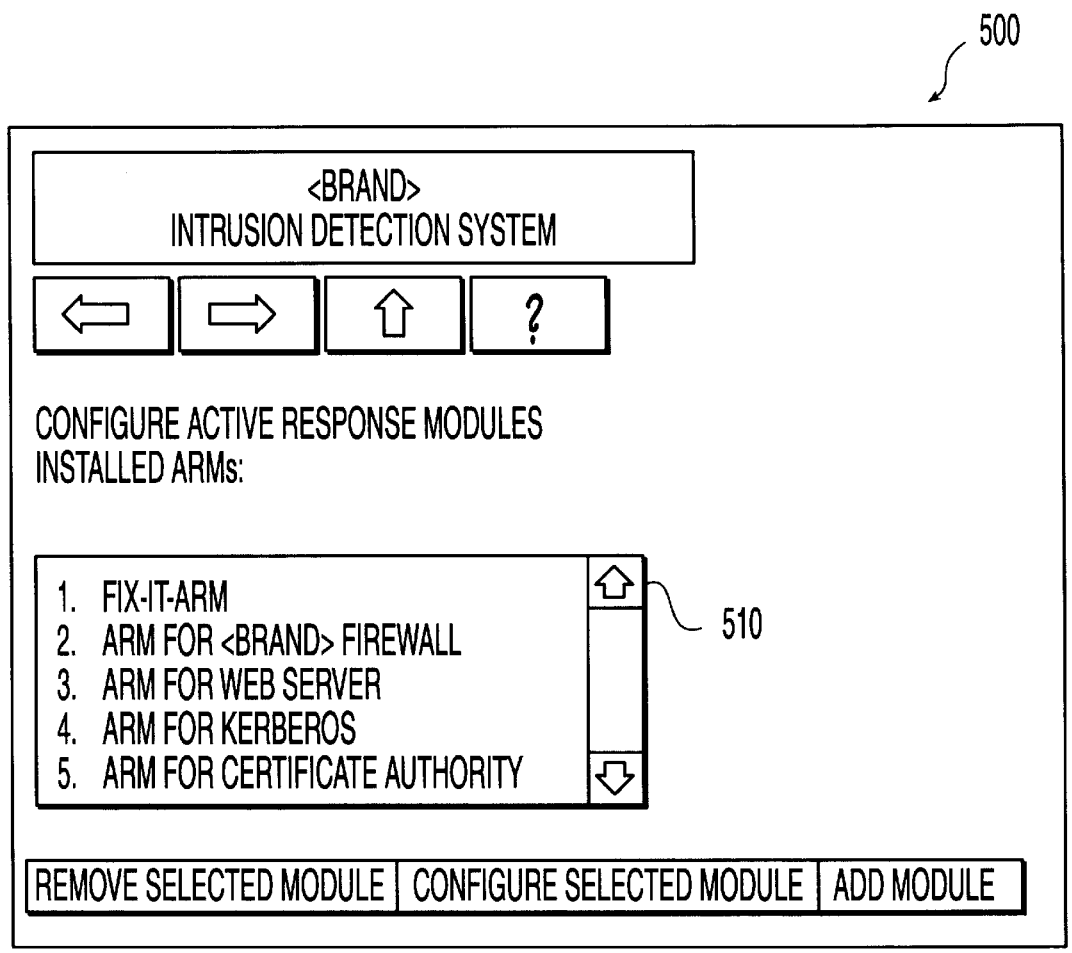
FIGS. 5A and 5B are illustrations of exemplary dialog boxes of a graphical user interface for selecting and configuring ARMs, respectively, according to a preferred embodiment of the present invention.

Referring to FIG. 5A, an illustration of an exemplary dialog box 500 of a graphical user interface (GUI) for selecting ARMs according to a preferred embodiment of the present invention is shown. Dialog box 500 may be used during configuration process 400 and more particularly steps 408–410. Dialog box 500 would be available to the sysadmin for use on workstation 122 with the particular IDS 120 installed within computer network 100 (shown as a generic brand name IDS 120 in FIG. 5A).

Within dialog box 500, a scrollable list 510 is used to list all available (i.e., installed) ARMs that the sysadmin may choose from. As part of the configuration process 400 (and more specifically step 410), the sysadmin may select, for example, an ARM for a particular brand name firewall. This selection within the scrollable list 510 is depicted in FIG. 5A by bolded text. The selection can be made by utilizing a pointing device (e.g., mouse), keyboard or the like to interact with the GUI, as is well-known in the relevant art(s).

Figure 5B:
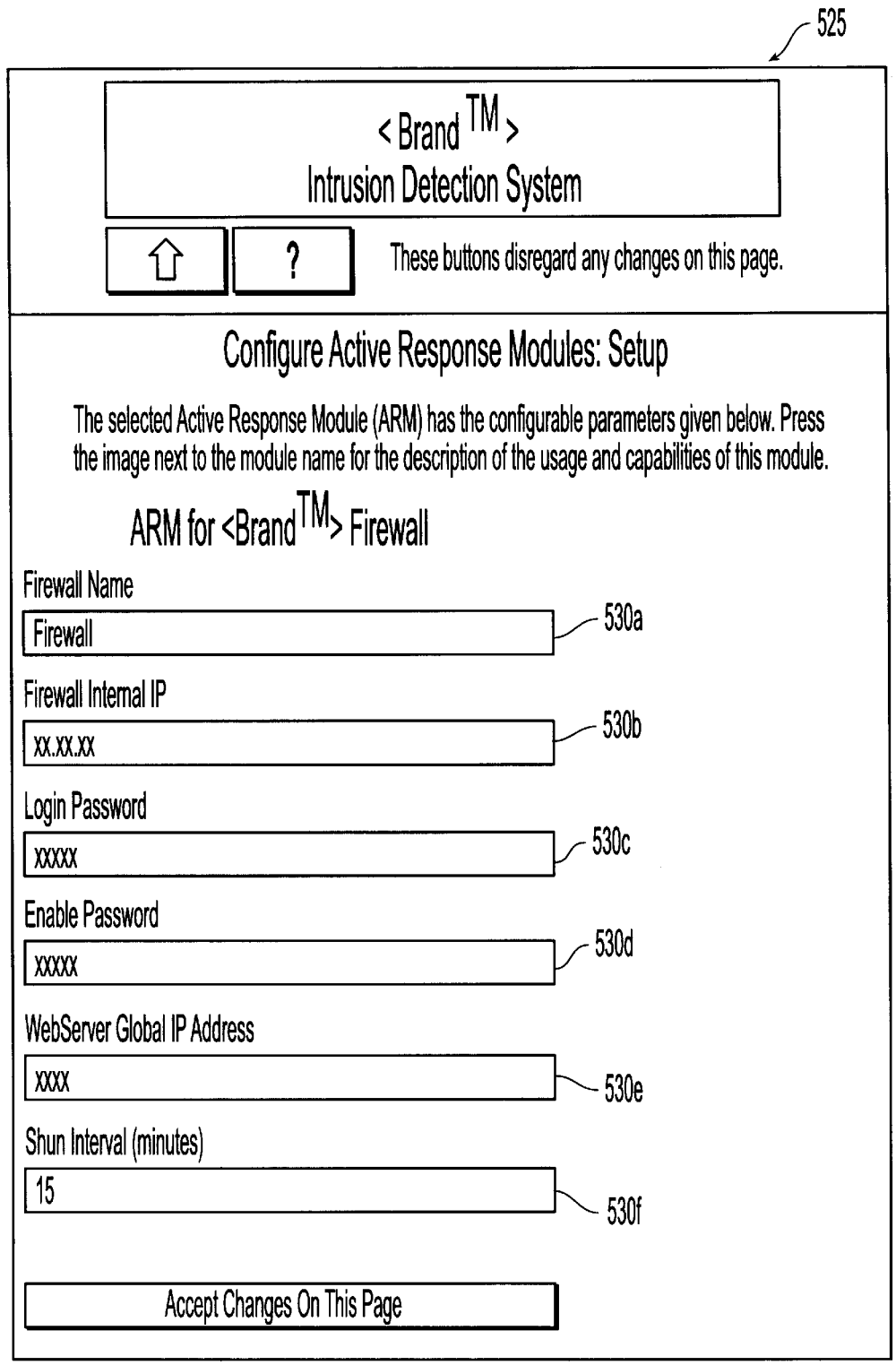

Referring to FIG. 5B, an illustration of an exemplary dialog box 525 of the GUI for configuring ARMs according to a preferred embodiment of the present invention is shown. Dialog box 525 may also be used during configuration process 400 and more particularly steps 412–414. Once a particular class of ARM is selected (as shown in FIG. 5A), dialog box 525 prompts the sysadmin for the configuration data needed using data fields 530a–f. The user can then utilize a pointing device and keyboard to enter the configuration data within the data fields 530. The particular data fields 530 displayed depends on the class of ARM selected from scrollable list 510 and the vendor validation component 222 of that ARM.

The present invention also contemplates using dialog boxes and the like as part of a GUI to interact with the user (sysadmin) of the ARMs for any data required. For example, dialog boxes similar to those illustrated in FIGs. 5A and 5B can be utilized on sysadmin workstation 122 to enter all user-specified data for the fix-it ARM as detailed above.

VIII. Detailed Example of Building an ARM: Fix-it

Now that specific classes of ARMs have been discussed, a more detailed discussion of ARM building process 300 and ARM architecture 200 can follow. For example, the building process 300 for a fix-it ARM according to a preferred embodiment of the present invention can now be shown in detail.

Referring again to FIG. 3, the ARM building process 300 for a fix-it ARM begins at step 302 with control passing immediately to step 304. In step 304, the developer develops a security policy for the fix-it arm. The security policy, for example, is directed to protecting the /etc/passwd file from unauthorized use and protecting the /usr/bin directory from tampering in a typical Unix system. The /etc/passwd file is sensitive because it contains the passwords for all the authorized users of a computing system such as computer network 100. The /usr/bin directory is sensitive because it typically contains the publicly accessible Unix user commands (e.g., "ls," "cd," etc.) and in susceptible to "Trojan horse" types of misuses. Thus, only the sysadmin (and any other authorized users) should normally be allowed to modify the /etc/passwd file or /usr/bin directory.

In step 306, a "fix-it.gif" file is created that contains an image which the GUI will use to associate configuration process 400, update process 425, and any help files with the new fix-it ARM. The developer may create, for example, an icon of a wrench for the fix-it ARM.

In step 308, a "fix-it.html" file is created that contains the actual help text for a user (e.g., the sysadmin) who clicks, via the GUI, the wrench icon created in step 306. The "fix-it.html" file contains information about the security policy of the ARM as well as the contents of Table 1 to assist the sysadmin in later configuring the ARM.

In step 310, the actual source code for the new fix-it ARM is written. The code implements the security policy developed in step 304. The code written in step 310 creates the ARM architecture 200 (as shown in FIG. 2). That is, the code forms the logic for the arguments component 210, actions component 220, and API component 230.

The arguments component 210 of architecture 200 specifies the parameters that the misuse engine of the IDS 120 must pass to the fix-it ARM when the ARM is invoked upon detection of an instance of misuse. These parameters include, for example, the pathname of the sensitive data. In a preferred embodiment, as mentioned above, all classes of ARMs may use the same standard parameter list. Thus, the code for the fix-it ARM will ignore the parameters within the standard parameter list that are not needed and these same parameters will be ignored by the actions component 220 code.

The code of the vendor validation component 222 of the fix-it ARM checks the data fields 530 that will be passed to the ARM when first configured via the GUI as described in FIG. 4A. Because the network element that the fix-it ARM will interact with is the disk operating system, the vendor validation component 222 checks data fields 530 which include, for example, directory name(s) and file name(s). Checking these data fields 530 during the configuration process ensures they will be accurate (i.e., the directory(ies) and file(s) exist within the directory structure) during run-time.

The code of the secure execution component 224 checks, at run-time (i.e., during the execution of the ARM), to make sure the process identification number (PID) of the process calling the ARM is that of the IDS 120. This check is necessary because the fix-it ARMs will, for example, delete a corrupt copy of the /etc/passwd file. Thus, the fix-it ARM must make sure its invocation and subsequent deletion of the file is in response to the IDS 120 ordering it to do so rather than an instruction from an outside hacker posing as the IDS 120.

The vendor response component 226 is the actual source code component that specifies the fix-it ARM's actions upon being invoked by the IDS 120. In this case, the response is code logic that implements permutations of the three fix-it options detailed in Table 1. This component directly interacts with the API component 230.

The API component 230 of architecture 200, specifies the interface by which the fix-it ARM accesses the network element it is designed to communicate with upon detection of an instance of misuse. As mentioned above, because the network element that the fix-it ARM will interact with is the disk operating system, the API component 230 involves system calls to the Unix operating system that involves the "cp" (Save_Bad option), "mv" (Restore option), and "rm" (Delete_Corrupt option) commands. The use of these Unix commands to accomplish the options of Table 1 will be apparent to one skilled in the relevant art(s).

Returning to FIG. 3, in step 312, the fix-it ARM executable is built. This is done, for example, by using the Unix make utility. As a result of step 312 (i.e., "make fix-it.exe"), an executable "fix-it.exe" file is created. In step 314, the newly built arm is tested. Once testing reveals that the new ARM functions properly, an install (e.g., "in_fix-it_ARM.sh") and an uninstall (e.g., "un_fix-it_ARM.sh") shell script are written for the new ARM instep 316. In step 318, the new ARM is installed for computer network 100 by the sysadmin (using the install script on workstation 122). The ARM building process 300 for the fix-it ARM is then complete as indicated by step 320.

IX. Intrusion Detection System-ARM Interaction

Figure 6:
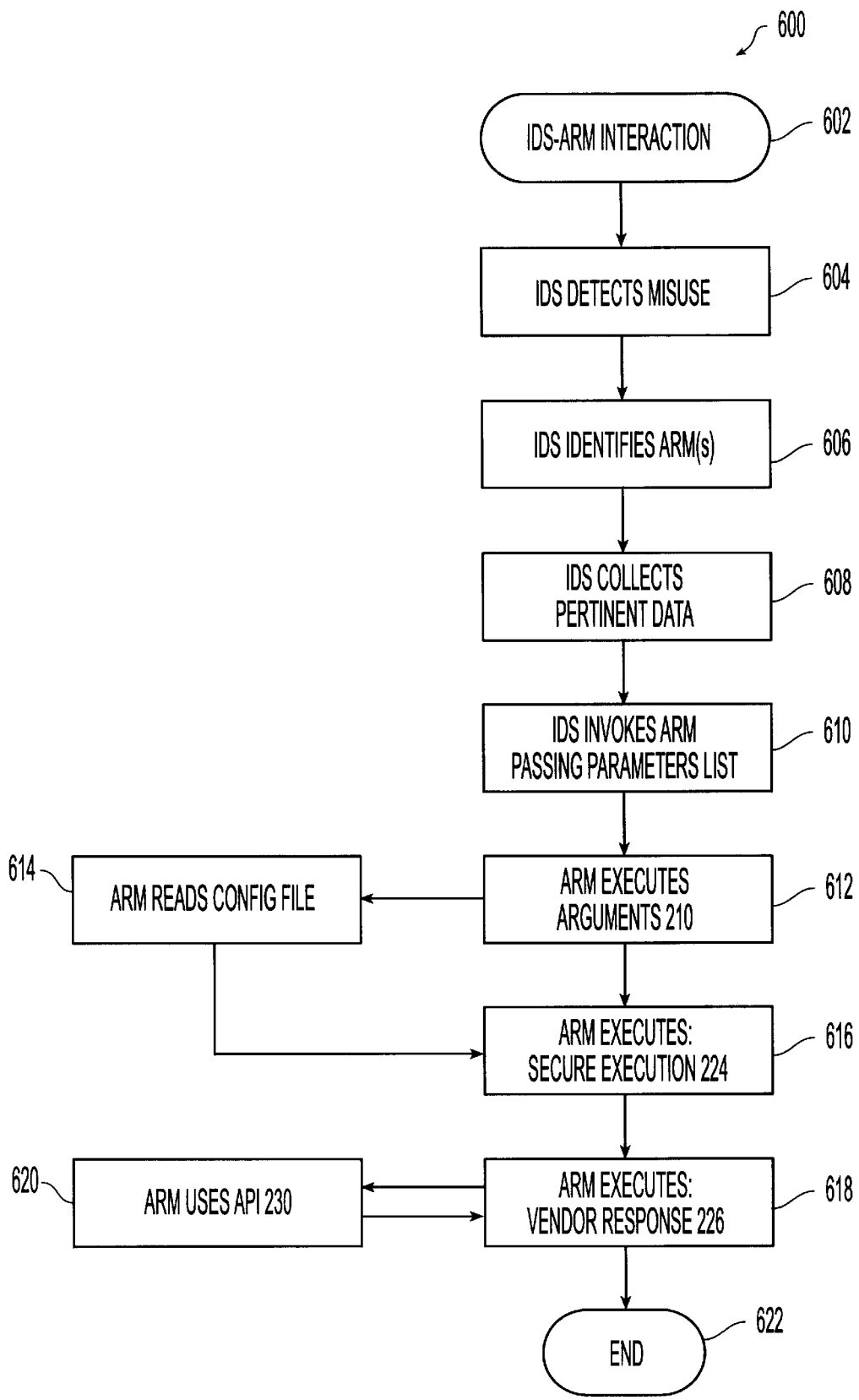
FIG. 6 is a flowchart representing the interaction between an intrusion detection system and an ARM according to a preferred embodiment of the present invention.

Referring to FIG. 6, a flowchart representing an interaction process 600 between an intrusion detection system (IDS) and an active response module (ARM) according to a preferred embodiment of the present invention is shown. Interaction process 600 begins at step 602 with control passing immediately to step 604. In step 604, the IDS software 120 detects an instance of misuse. In step 606, the IDS 120 identifies the ARM(s) associated with and activated for the particular instance of misuse detected. Once the ARM(s) are identified, the IDS 120 collects, in step 608, the pertinent data from the misuse engine to fill-in the standard parameter list for the particular ARM(s) being invoked. Then, in step 610, the IDS 120 invokes the identified ARM(s) by making a system call to the ARMs *.exe file passing the standard parameter list as command line options as will be apparent to one skilled in the relevant art(s).

In step 612, the ARM executes by first collecting the relevant data from the standard parameter list passed by the IDS 120. The collected data is specified by the ARM's arguments component 210 (of ARM architecture 200 as shown in FIG. 2). In step 614, the ARM opens its configuration (*.dat) file to read all the user-specified configuration data. This is the data collected from data fields 530 and driven by the vendor validation component 222 as part of configuration process 400 (see steps 412–418 of FIG. 4A).

In step 616, the ARM performs its security routine as specified by the ARM's secure execution component 224. Step 616 involves, for example, checking the PID of its parent process to ensure it belongs to the IDS software 120. In step 618, the ARM responds to the detected instance of misuse. The ARMs response is dictated by (executing) the code in its vendor response component 226. As part of the ARM's response to the detected misuse, the ARM may have to communicate with one or various network elements on LAN 101. Thus, in step 620, the ARM utilizes its API component 230 to communicate with the particular network element(s) it is designed to interact with. Once the ARM's response to the detected misuse is complete, interaction process 600 ends as indicated by step 622.

If, for example, more than one ARM is associated with and activated for the misuse detected in step 604, steps 608 to 620 of the interaction process 600 would be performed for each of the identified ARMs.

X. Environment

Figure 7:
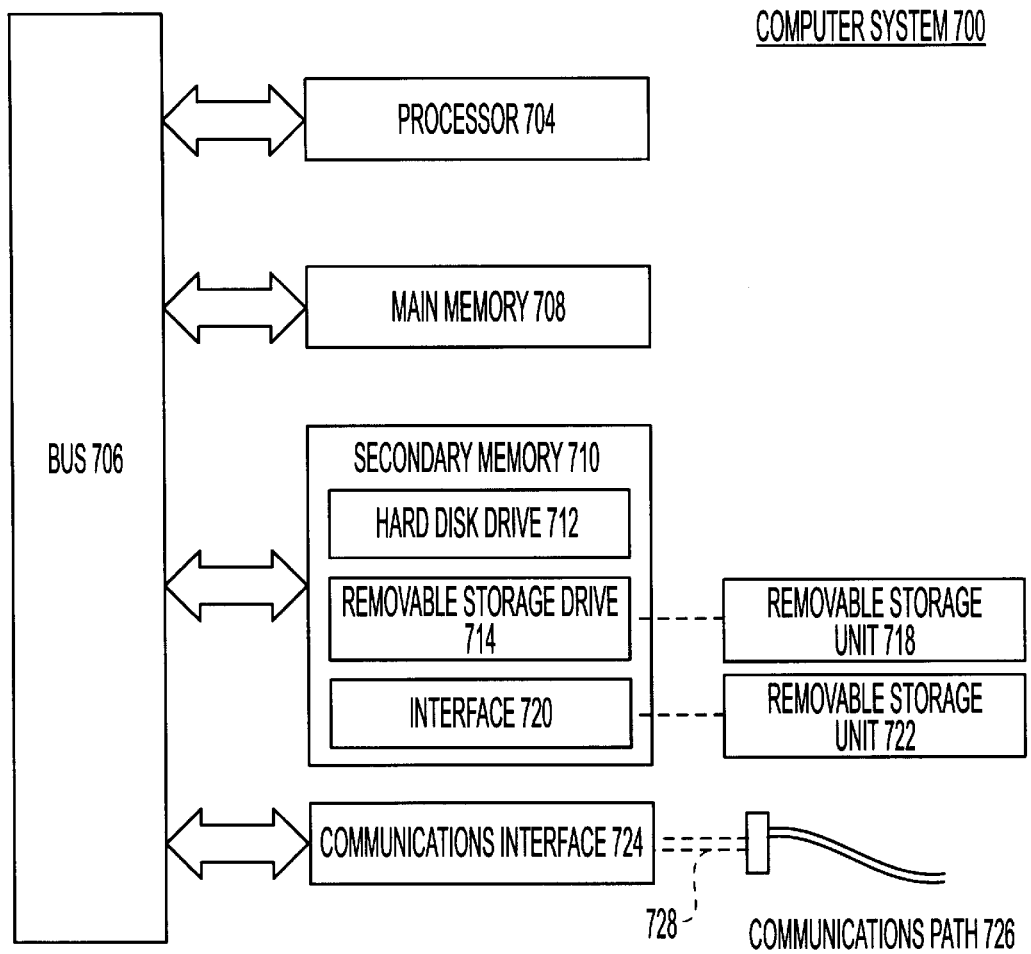
FIG. 7 is a block diagram of an exemplary computer system useful for implementing the present invention.

The present invention may be implemented using hardware, software or a combination thereof and may be implemented in a computer system or other processing system. In fact, in one embodiment, the invention is directed toward one or more computer systems capable of carrying out the functionality described herein. An example of a computer system 700 is shown in FIG. 7. The computer system 700 includes one or more processors, such as processor 704. The processor 704 is connected to a communication bus 706. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCM-CIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 728. These computer program products are means for providing software to computer system 700. The invention is directed to such computer program products.

Computer programs (also called computer control logic) are stored in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

XI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for automatically responding to an instance of computer misuse, comprising the steps of:
    (1) selecting an active response module (ARM) from a plurality of available ARMs;
    (2) linking said ARM to a computer misuse;
    (3) invoking said ARM in response to an instance of said computer misuse;
    (4) receiving, by said ARM, data pertinent to said instance of said computer misuse; and
    (5) performing actions, by said ARM, using said data to thereby respond to said instance of said computer misuse.

2. The method of claim 1, wherein steps (1)–(2) are preformed using a graphical user interface.

3. The method of claim 1, wherein each of said plurality of available ARMs belongs to one of the following classes of ARMs:
Firewall ARMs;
Kerberos ARMs;
Certificate Authority ARMs;
Web Server ARMs;
Environmental Security Management ARMs;
Fix-it ARM; and
Standard ARMs.

4. A system for use with an intrusion detection system that allows automatic responses to an instance of computer misuse, comprising:
first means for providing a user with a list of a plurality of ARMs;
second means for allowing said user to configure each of said plurality of ARMs; and
third means for allowing said user to link at least one of said plurality of ARMs to a computer misuse.

5. The system of claim 4, wherein each of said ARMs comprises:
an arguments component;
an actions component comprising:
a vendor validation component;
a secure execution component; and
a vendor response component; and
an applications program interface component.

6. The system of claim 5, further comprising:
a toolkit to allow said user to build an additional ARM to include in said list of said plurality of ARMs.

7. The system of claim 4, wherein each of said plurality of ARMs belongs to one of the following classes of ARMs:
Firewall ARMs;
Kerberos ARMs;
Certificate Authority ARMs;
Web Server ARMs;
Environmental Security Management ARMs;
Fix-it ARM; and
Standard ARMs.

8. A system, comprising:
a data processing element;
an intrusion detection system;
a plurality of pre-defined ARMs each having means for instructing said data processing element to perform an action in response to a command from said intrusion detection system;
means for activating a subset of said plurality of pre-defined ARMs for a misuse;
wherein said intrusion detection system comprises:
means for detecting said misuse;
means for identifying said subset activated for said misuse; and
means for invoking said subset to thereby respond to said misuse.

9. The system of claim 8, wherein each of said plurality of pre-defined ARMs belong to one of the following classes of ARMs:
Firewall ARMs;
Kerberos ARMs;
Certificate Authority ARMs;
Web Server ARMs;
Environmental Security Management ARMs;
Fix-it ARM; and
Standard ARMs.

10. The system of claim 8, further comprising:
means for defining an additional ARM, wherein said additional ARM also has means for instructing said data processing element to perform an action in response to a command from said intrusion detection system.

11. A Fix-it active response module (ARM), for use with an intrusion detection system, which allows automatic response to detected instances of computer misuse, comprising:
first means for allowing a user to specify a sensitive directory;
second means for updating a cache by copying data located within said sensitive directory to said cache;
third means for allowing said user to specify the frequency for updating said cache by said second means;
fourth means for allowing said user to toggle one or more of the following fix-it options:
(i) Restore;
(ii) Save_Bad; and
(iii) Delete_Corrupt;
fifth means, responsive to said Restore fix-it option, for copying said data from said cache to said sensitive directory based on an instance of detected misuse by the intrusion detection system;
sixth means, responsive to said Save_Bad fix-it option, for copying a corrupted version of said data from said sensitive directory based on said instance of detected misuse by the intrusion detection system; and
seventh means, responsive to said Delete_Corrupt fix-it option, for deleting said corrupted version of said data from said sensitive directory based on said instance of detected misuse by the intrusion detection system.

12. A computer program product comprising a computer usable medium having computer readable program code means embodied in said medium for causing an application program to execute on a computer that provides a fix-it active response module (ARM), for use with an intrusion detection system, which allows automatic response to detected instances of file related computer misuse, said computer readable program code means comprising:
a first computer readable program code means for causing the computer to allow a user to specify a sensitive directory;
a second computer readable program code means for causing the computer to update a cache by copying data located within said sensitive directory to said cache;
a third computer readable program code means for causing the computer to allow a user to specify the frequency for updating said cache by said second means;
a fourth computer readable program code means for causing the computer to allow said user to toggle one or more of the following fix-it options:
(i) Restore;
(ii) Save_Bad; and
(iii) Delete$_{13}$Corrupt;
a fifth computer readable program code means for causing the computer to respond to said Restore fix-it option and copy said data from said cache to said sensitive directory based on an instance of detected misuse by the intrusion detection system;

a sixth computer readable program code means for causing the computer to respond to said Save_Bad fix-it option and copy a corrupted version of said data from said sensitive directory based on said instance of detected misuse by the intrusion detection system; and a seventh computer readable program code means for causing the computer to respond to said Delete_Corrupt fix-it option and delete said corrupted version of said data from said sensitive directory based on said instance of detected misuse by the intrusion detection system.

13. A computer program product comprising a computer usable medium having computer readable program code means embodied in said medium for causing an application program to execute on a computer that provides a system for use with an intrusion detection system that allows automatic responses to an instance of computer misuse, said computer readable program code means comprising:

a first computer readable program code means for causing the computer to provide a user with a list of a plurality of ARMs;

a second third computer readable program code means for causing the computer to allow said user to configure each of said plurality of ARMs; and a third computer readable program code means for causing the computer to allow said user to link at least one of said plurality of ARMs to a computer misuse.

* * * * *